Feb. 18, 1947.   A. C. RUGE   2,416,276
INSTANTANEOUS RECORDER
Filed July 13, 1944
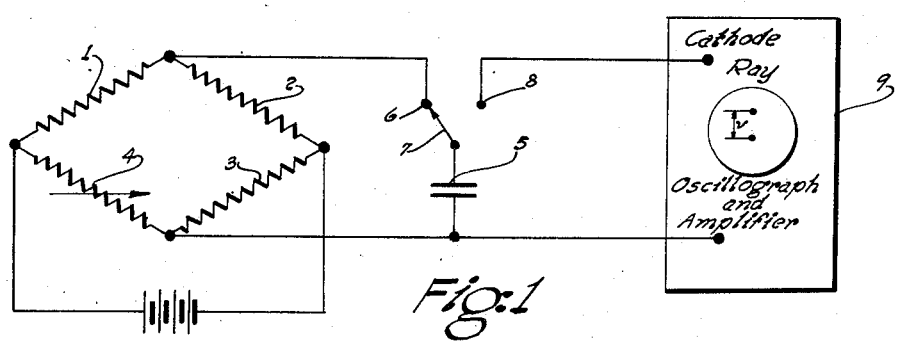
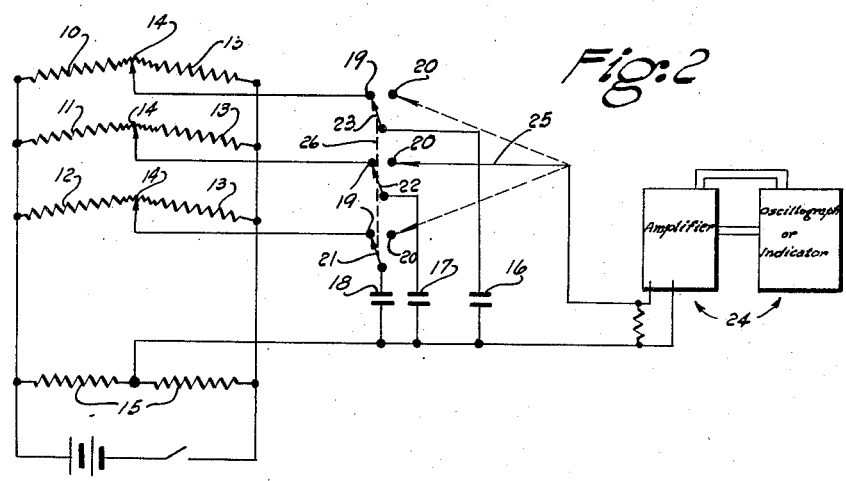
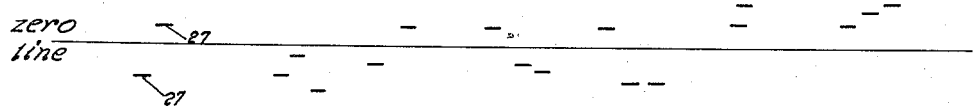
INVENTOR
Arthur C. Ruge
BY
ATTORNEY Patented Feb. 18, 1947

2,416,276

UNITED STATES PATENT OFFICE 2,416,276

INSTANTANEOUS RECORDER

Arthur C. Ruge, Cambridge, Mass., assignor to The Baldwin Locomotive Works, a corporation of Pennsylvania Application July 13, 1944, Serial No. 544,797

2 Claims. (Cl. 73—88)

This invention relates to apparatus adapted to make a simultaneous record of a plurality of electrical strain measurements or voltages.

In testing a structure such as an airplane or other type of device it is frequently desirable to make simultaneously a great many strain measurements of either a transient load condition as during a dynamic test or of static loads during progressive loading of the structure.

It is an object of my invention to provide improved method and apparatus that will permit strain readings of electrical strain gages to be recorded simultaneously and substantially instantaneously for the given instant at which it is desired to determine the strain and thereafter to observe or permanently record individually the several measured strains.

In the specific embodiment of the invention shown herein the strain gages are preferably of the bonded wire type shown in Simmons Patent 2,292,549 whereby the electrical resistance of the gage varies with its strain and each gage in my invention is adapted to be electrically connected with an individual condenser thereby to charge the condenser when its switch is closed with an impressed voltage determined by the resistance change of the wire in accordance with the strain thereof. After the condenser has been charged in the foregoing manner the charging switch is opened and the condenser is thereafter connected to recording or indicating means. In the event that a transient strain condition is desired to be measured, the condenser-charging switches of all gages will be opened substantially simultaneously. The condenser-recording switches may then be successively and individually connected into a single recording apparatus or multiple recording or indicating apparatus may be employed if desired. The term recording also broadly includes indicating.

Other objects and advantages will be more apparent to those skilled in the art from the following description of the accompanying drawing in which:

Fig. 1 is a diagrammatic illustration of my improved apparatus as applied to a single condenser device;

Fig. 2 is a diagrammatic outline of my improved apparatus applied to a plurality of different gages; and Fig. 3 is a chart showing the permanent recording of the condenser charges.

In the particular embodiment of the invention disclosed herein I have first shown a single gage operation consisting of a bridge having a strain gage 1, fixed resistors 2 and 3 and a variable resistor 4 which allows the bridge to be balanced before starting a test. The gage 1 is of the bonded wire type and hence after a test is started any change in strain in the member to which it is bonded will cause the resistance of the gage to change with a consequent unbalance of the bridge. The unbalanced voltage of the bridge will be impressed upon a condenser 5 when a condenser-charging contact 6 is closed by a switch arm 7. If the change in strain is of a stable character, the contact 6 may be closed and then opened at leisure but if the strain is of a transient nature the contact 6 will be opened at the instant of time when it is desired to record the magnitude of strain. To determine the strain effects upon the condenser 5 the switch arm 7 engages a contact 8 which then discharges the condenser upon any suitable recorder such as a cathode ray oscillograph with an amplifier if desired, all generally indicated at 9. The condenser voltage will then be represented by the distance $v$. To obtain higher output voltages one or more of arms 2, 3 and 4 may also be strain sensitive gages so strained as to be cumulative in their effect of unbalancing the bridge.

In the multi-gage arrangement of Fig. 2, a series of any desired number of gages are diagrammatically indicated at 10, 11 and 12, these gages again being preferably of the Simmons type above mentioned. Usual resistors 13, balancing potentiometers 14 and resistors 15 are employed to provide bridge circuits. Arms 13 may be strain gages as mentioned in the last paragraph. Each gage has its own individual condenser, such as 16, 17 and 18 for the gages 10 to 12 respectively. Charging and recording contacts 19 and 20 are provided for each condenser, and individual switches 21, 22 and 23 close and open the respective contacts. After the condensers are charged by the voltage resulting from the individual strains of the strain gages 10 to 12 the switches 21, 22 and 23 are then engaged with all of the contacts 20 after which the condensers may be successively connected into a suitable recording apparatus, such as previously mentioned and generally indicated at 24, by a switch arm 25 which swings successively across the series of contacts 20. The switch arms 21 to 23 may be simultaneously operated by a common switch operating link 26, if desired. A permanent record from the oscillograph may be recorded on a film which would indicate the successive voltages by marks such as 27, Fig. 3, these marks being suitably identified by the gauge numbers 10, etc.

From the foregoing disclosure it is seen that I have provided a very simple and rapid means for recording simultaneously a great many strain values and of subsequently transferring those recorded values successively to a visual or permanent recording instrument.

It will be evident that my method and apparatus may be applied to many problems besides strain gaging. For example, in a power plant or laboratory set-up involving voltages of any magnitude which are to be observed or recorded simultaneously. My system is very convenient and practical. The voltages need not come from a bridge, as I have illustrated, but may come from any source. The readings can be made on a meter of electrostatic or vacuum tube voltmeter type, if desired, or a pen-and-ink recorder can be operated through an amplifier.

Other uses of my system are: scanning of resistance-type thermometers, thermocouple voltages, electrical pressure gages and other electrical pickups.

If the voltage sources cannot be commoned as I have shown them, the individual condensers are switched at both terminals. The echelon bridge shown in Fig. 2 is merely a convenient means for energizing a multiplicity of gages or other impedance elements from a single source with a minimum power loss. Many variations in circuit details will be evident to those skilled in the art.

It will of course be understood that various changes in details of construction and arrangement of parts may be made by those skilled in the art without departing from the spirit of the invention as set forth in the appended claims.

I claim:

1. Indicator apparatus comprising, in combination, a plurality of electrical strain gages whose resistance varies in accordance with strain, means including said strain gages for producing voltage outputs proportional to the respective individual resistance changes of said strain gages, a plurality of condensers one for each strain gage, means for simultaneously connecting said voltage outputs to their individual condensers to charge the same with a voltage which is proportional to the individual resistance changes of the strain gages and thereafter disconnecting the condensers from said voltage outputs, and indicator means into which the condensers may be individually connected to provide an indication of the magnitude of strain in accordance with the change of resistance of the gages.

2. Indicator apparatus comprising, in combination, a plurality of condition-responsive electrical impedance elements, means including said element for producing voltage outputs in response to the respective conditions, a plurality of condensers one for each element, means for simultaneously connecting the voltage outputs to their respective condensers to charge the same with voltages equal to the respective output voltages and thereafter disconnecting the condensers from the voltage outputs, and indicator means into which the condensers may be individually connected to provide an indication of the magnitude of the several conditions actuating said elements.

ARTHUR C. RUGE.

REFERENCES CITED

The following references are of record in the file of this patent:

UNITED STATES PATENTS

| Number | Name | Date |
|---|---|---|
| 2,252,464 | Kearns | Aug. 12, 1941 |
| 2,228,883 | Morgan | Jan. 14, 1941 |
| 2,316,975 | Ruge | Apr. 20, 1943 |
| 2,133,437 | Dodds | Oct. 18, 1938 |
| 2,186,727 | Martin | Jan. 9, 1940 |
| 2,177,569 | Jorgensen | Oct. 24, 1939 |
| 1,851,947 | Mirick | Mar. 29, 1932 |
| 2,133,670 | Schuchmann | Oct. 18, 1938 |
| 1,387,552 | Merritt | Aug. 16, 1921 |

FOREIGN PATENTS

| Number | Country | Date |
|---|---|---|
| 398,985 | German | July 16, 1924 |

OTHER REFERENCES

Tech. Pub. "Strain Gages" in Electronics, Dec. 1943, pp. 106–111, 192 and 194. (Photostatic copy in U. S. Patent Office.) 175–183–2.